Oct. 18, 1927.
W. ENSDORF ET AL
1,646,238
ELECTRICAL SOLDERING IRON
Filed Aug. 11, 1926
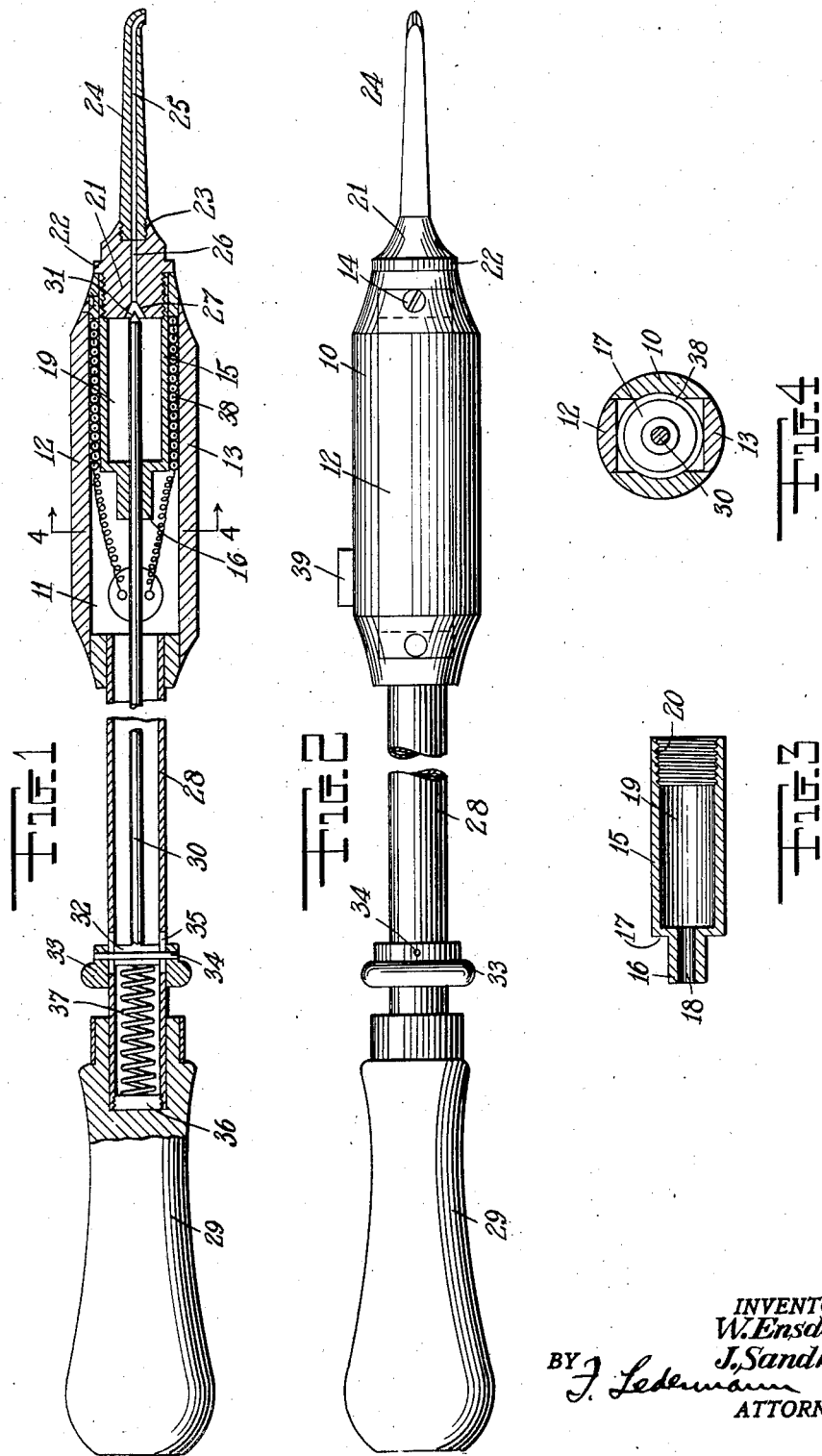
INVENTORS
W. Ensdorf
J. Sandberg
BY
ATTORNEY Patented Oct. 18, 1927.

1,646,238

UNITED STATES PATENT OFFICE.

WALTER ENSDORF, OF NEW YORK, N. Y., AND JOHANNES SANDBERG, OF ELIZABETH, NEW JERSEY.

ELECTRICAL SOLDERING IRON.

Application filed August 11, 1926. Serial No. 128,526.

The main object of this invention is to provide an electric soldering iron which employs a reservoir entirely surrounded by a resistance coil which heats said reservoir and retains solder within the same in a flowing state.

Another object is to provide an electric soldering iron having a body which encases a cylindrical reservoir removable from the body and a plunger which opens and closes a channel leading to the soldering head of the device so that the flow of solder to the tip of the device may be regulated and controlled.

Still another object is to provide an electric soldering iron equipped with a reservoir and a soldering head in which a channel is provided communicating with the chamber of the reservoir and which is opened and closed by a plunger operated from a position below the handle of the device. The soldering iron is constructed so that it normally remains closed by the action of a spring situated in the handle of the device and is opened by a pull upon a ring encircling the device beneath the handle.

The above and other objects will become apparent in the description below, in which characters of reference refer to like-named parts in the drawing.

Referring briefly to the drawing, Figure 1 is a longitudinal sectional elevational view thru the electric soldering iron, showing the plunger unseated from its place in the soldering head to permit the flow of solder to the tip or nose of the device.

Figure 2 is an exterior longitudinal elevational view of the electric soldering iron.

Figure 3 is a longitudinal sectional elevational view of the solder reservoir per se.

Figure 4 is a cross sectional view taken on line 4—4 of Figure 1.

Referring in detail to the drawing, the numeral 10 indicates the body of the soldering iron. This body is substantially circular in cross section, having a hollow chamber 11 to which access is gained thru opposing cover plates 12 and 13, which are secured in place by screws 14. The chamber 11 in the body is circular in cross section and at one end is open to receive a cylinder shell 15 which serves as a solder reservoir. This shell has a hub 16 projecting from its closed end 17 thru which a hole 18 passes. The remainder of the shell 15 forms a compartment 19 which is open at the end opposite to the hub and at this open end, internal threads 20 are provided. The internal threads of the shell 15 are engaged by similar threads formed on a soldering head 21 which has an encircling flange 22, the latter serving as a stop by shouldering upon the outer surface of the open end of the body 10. The outer end of the soldering head 21 is provided with a substantially conical outline into which the threaded end 23 of a substantially longer tapering soldering nose 24 is threadably inserted. This tapering nose has a channel 25 extending thruout its length which communicates with a passage 26 formed in the soldering head. The end of the soldering head 21 which is threadably inserted into the shell 15, is provided with a conical seat 27 at the end of the passage 26.

A tube 28 is fixed to one end of the body 10 and extends longitudinally therefrom. This tube has a handle 29 secured to its outer end. A rod 30 is mounted axially in the tube 28, extending thruout the greater portion of its length and projects into the chamber 11 and then passes thru the hole 18 of the shell 15 into the portion 19. The end of the plunger is provided with a conical tip 31 which is adapted to seat upon the surface 27 and normally closes communication between the passage 26 and the chamber 19. The opposite end of the plunger is provided with a head 32 which is slidable in the tube 28 and is secured to a mover ring 33 which encircles the exterior of the tube 28 by a pin 34, the latter passing thru slots 35 provided on opposite sides of the wall of the tube 28. At the extreme end of the tube 28, a threaded plug 36 is mounted. Between this plug and the head 32 of the plunger 30, a spring 37 is seated. Said spring normally urges the plunger 30 toward the body of the device so that the conical tip normally seats upon the surface 27 to close communication between the channel and the chamber 19 so that no solder will flow into the nose 24.

When the shell 15 is inserted into the body 10 of the device, an annular space exists between the external periphery of the shell and the internal periphery of the body 10. In this space, a helically wound resistance coil 38 is positioned. This coil is retained fixed upon the interior wall of the body 10 by asbestos cement or the like so that when the shell 15 is extracted, the coil 38 will not be disturbed by its passage. Lead wires are connected to opposite ends of the coil and extend upwardly in the chamber 11 of the body 10 and are fixed to the terminals of a plug 39 which cooperates with a socket of a line current to furnish current to the coil so that the same becomes luminous.

The device is adapted to be used as a fountain soldering iron eliminates the constant dipping of a device of similar type into a bar of solder in order to replenish the supply of this metal upon the soldering tip or nose of the iron. This solder which may be in the form of globules, wire, or chunks of a solder bar, is inserted into the chamber 19 of the shell 15 after the head 21 has been detached from said shell. The shell is frictionally held in place in the end of the body 10 and is completely encircled and surrounded by the coil 38. As the circuit is closed from the line current thru the plug 39, the helical resistance coil 38 becomes luminous and heats the contents of solder in chamber 19 to the molten and fluid state. The tip 31 of the plunger 30 normally is seated on the surface 27 and retains the solder within the reservoir. In order to permit the solder to flow from the chamber 19 of the reservoir to the tip of the soldering nose 24, the ring 33 is lifted by the fingers holding the device in the hand. This lifts the plunger 30 and unseats the tip 31 from the surface 27, as indicated in Figure 1. The solder will then flow thru the passage 26 and thru the entire length of the channel 25 in the soldering nose and will finally be emitted at the mouth situated at the extreme end of said nose. When pull on the ring 33 is released, the spring urges said plunger downwardly so that the tip of the plunger again seats on the surface 27 and shuts off the flow of liquid solder.

It is to be noted that certain changes in form and construction may be made without departing from the spirit and scope of the invention.

We claim:—

A device of the class described comprising: a hollow cylindrical body, a slidably removable reservoir open at its outer end inserted into said body, a soldering head threadably engaging said reservoir at the outer end and having a channel communicating with said reservoir, the outer end of said soldering head being threaded to receive a soldering nose, a helical resistance coil encircling said reservoir and mounted in said body, a plunger, a tube extending from said body, said plunger passing thru said tube and said reservoir, means for normally lowering said plunger to close the passage in said soldering head comprising a spring engaging one end of said plunger and a ring mounted externally on said tube rigid with said plunger and adapted to lift the plunger free of the soldering head when lifted.

In testimony whereof we affix our signatures.

WALTER ENSDORF.
JOHANNES SANDBERG.